United States Patent
Zuk

(10) Patent No.: US 9,178,851 B2
(45) Date of Patent: *Nov. 3, 2015

(54) HIGH AVAILABILITY SECURITY DEVICE

(71) Applicant: Palo Alto Networks, Inc., Santa Clara, CA (US)

(72) Inventor: Nir Zuk, Menlo Park, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/864,735

(22) Filed: Apr. 17, 2013

(65) Prior Publication Data

US 2013/0298222 A1    Nov. 7, 2013

Related U.S. Application Data

(63) Continuation of application No. 12/852,902, filed on Aug. 9, 2010, now Pat. No. 8,443,434.

(60) Provisional application No. 61/249,130, filed on Oct. 6, 2009.

(51) Int. Cl.
*H04L 29/06*    (2006.01)

(52) U.S. Cl.
CPC ................. *H04L 63/0227* (2013.01)

(58) Field of Classification Search
CPC ................. H04L 63/0227; G06F 17/00
USPC ................................................ 726/13
See application file for complete search history.

(56) References Cited

U.S. PATENT DOCUMENTS

| 7,478,429 B2 * | 1/2009 | Lyon ............................ 726/23 |
| 8,339,959 B1 * | 12/2012 | Moisand et al. .............. 370/235 |
| 2010/0070647 A1 * | 3/2010 | Irino et al. .................... 709/234 |

* cited by examiner

*Primary Examiner* — Ellen Tran
(74) *Attorney, Agent, or Firm* — Van Pelt, Yi & James LLP

(57) ABSTRACT

Methods, systems, and apparatus, including computer programs encoded on a computer storage medium, for processing a first plurality of packets using one or more processors and maintaining one or more flow records associated with the first plurality of packets, and processing a second plurality of packets without maintaining flow records associated with the second plurality of packets and allowing the second plurality of packets to pass to one or more destinations.

30 Claims, 6 Drawing Sheets

HIGH AVAILABILITY SECURITY DEVICE

CROSS-REFERENCE TO RELATED APPLICATIONS

This application is a continuation of co-pending U.S. patent application Ser. No. 12/852,902, entitled HIGH AVAILABILITY SECURITY DEVICE, filed Aug. 9, 2010, which is incorporated herein by reference for all purposes, which claims priority to U.S. Provisional Application No. 61/249,130, entitled HIGH AVAILABILITY SECURITY DEVICE, filed Oct. 6, 2009, which is incorporated herein by reference for all purposes.

BACKGROUND

Security devices can be used to protect a computer network from unauthorized, malicious or disruptive users. Examples of security devices include firewalls, Intrusion Detection Systems (IDSs), Intrusion Prevention Systems (IPSs), Unified Threat Management (UTM) systems, and the like.

Some security devices are flow-based (also known as stateful security devices). Flow-based security devices typically store information regarding flows associated with received packets. Flow-based security devices can perform security processing (for example, determining whether to drop a packet or allow it to pass) using the stored information regarding flows. Typically, a flow-based security device stores information regarding flows in a flow table (also known as a session table or a state table).

Flow-based security devices are capable of tracking a limited number of flows. The number of flows is limited by, for example, the amount of memory available to a flow table, the processing power of the security device (for instance, a Central Processing Unit (CPU) speed), and the like. Flow-based security devices are not capable of handling new flows when their flow tables are saturated (when they lack capacity to store information on additional flows). Consequently, a flow-based security device will cause a denial of service (DoS) to resources protected by the flow-based security device when its flow table is saturated.

Attackers can attempt DoS attacks on flow-based security devices by attempting to saturate the flow table. For example, attackers can send a large number of illegitimate packets, sometimes referred to as a flood. A flow-based security device will attempt to store flow information for all of the packets in the flood, and consequently, the flow table will become saturated if it does not have sufficient capacity. Examples of flood attacks include Transmission Control Protocol (TCP) SYN floods, User Datagram Protocol (UDP) floods, and Internet Control Message Protocol (ICMP) floods.

SUMMARY

In general, one aspect of the subject matter described in this specification can be embodied in a method that includes a method comprising processing a first plurality of packets using one or more processors and maintaining one or more flow records associated with the first plurality of packets, and processing a second plurality of packets without maintaining flow records associated with the second plurality of packets and allowing the second plurality of packets to pass to one or more destinations, where processing the second plurality of packets includes: receiving a second packet; determining not to maintain a flow record for a second flow associated with the second packet; and allowing the second packet to pass to one of the one or more destinations. Other embodiments of this aspect include corresponding systems, apparatus, and computer program products.

These and other embodiments can optionally include one or more of the following features. Processing the first plurality of packets includes receiving a first packet and, based on first header information of the first packet, determining whether a flow record exists for a first flow associated with the first packet, where the first flow associated with the first packet comprises a sequence of one or more packets received to which the first packet belongs. Determining that a flow record for the first flow associated with the first packet does not exist. Creating a new flow record for the first flow associated with the first packet. Determining whether to allow the first packet to pass to one of the one or more destinations. Determining whether a flow record exists for a first flow associated with the first packet includes determining whether the flow record is present in a flow table; and wherein creating a new flow record for the first flow associated with the first packet includes adding the new flow record to the flow table. Creating a new flow record for the first flow associated with the first packet includes identifying an application associated with the first packet. The first header information includes two or more of: a source port, a destination port, a source address, a destination address, and a protocol. Determining not to maintain a flow record for a second flow associated with the second packet includes determining that the second packet is associated with a peer-to-peer networking application. Determining not to maintain a flow record for a second flow associated with the second packet includes determining that the second packet is associated with Domain Name Service (DNS) traffic. Determining that the second packet is associated with DNS traffic includes determining that the destination address of the second packet or the source address of the second packet corresponds to a trusted DNS server. The second packet can be a TCP packet or a UDP packet.

In general, another aspect of the subject matter described in this specification can be embodied in a method that includes a method comprising processing a first plurality of packets using one or more processors and maintaining one or more flow records associated with the first plurality of packets, and processing a second plurality of packets without maintaining flow records associated with the second plurality of packets and allowing the second plurality of packets to pass to one or more destinations, where processing the second plurality of packets includes: receiving a second packet; determining not to maintain a flow record for a second flow associated with the second packet; and blocking the second packet. Other embodiments of this aspect include corresponding systems, apparatus, and computer program products.

Particular embodiments of the subject matter described in this specification can be implemented so as to realize one or more of the following advantages. Flow table saturation can be prevented in a flow-based security device, and thus denial of service can be prevented. Consequently, the flow-based security device has higher availability. A filter in a flow-based security device can allow certain packets to pass without adding flow records for those packets to the flow table. A flow-based security device can handle a larger volume of traffic given fixed resources, for example, memory and processing power.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
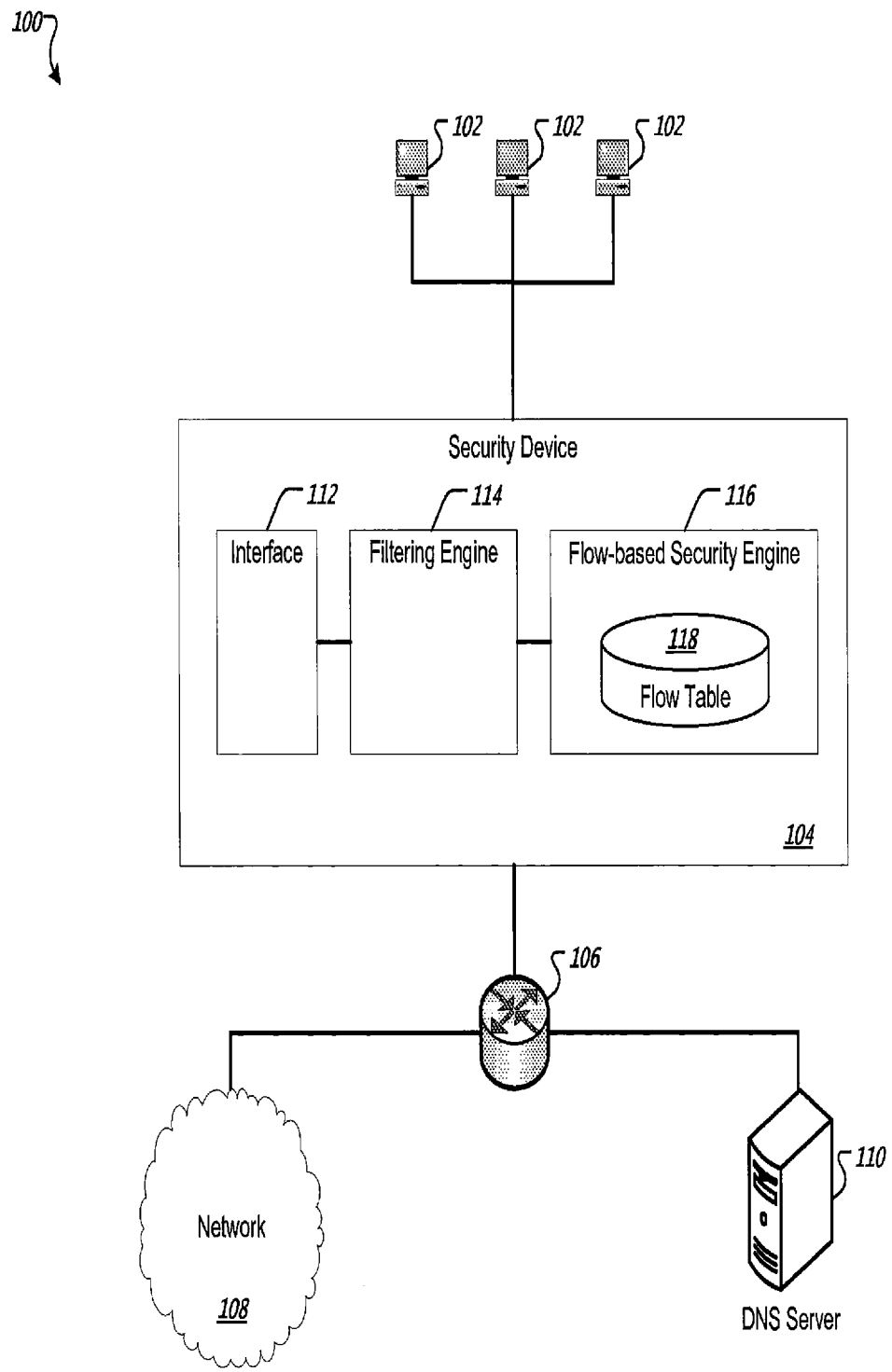
FIG. 1 shows an example network topology 100.

FIG. 1 shows an example network topology 100. The example network topology 100 includes workstations 102, a security device 104, a router 106, and a Domain Name Service (DNS) server 110. The router 106 is connected to a network 108, for example, the Internet.

The network topology shown in FIG. 1 is merely an example. The network can be configured in various ways. For example, the network can include additional security devices, the security device 104 can be integrated with the router 106, and so on. In addition to the workstations 102, various devices can communicate using the security device 104, for example, mobile devices, Voice over IP (VOIP) phones, and the like. Other network topologies are possible including those that include more than one network, wide area networks, local area networks or combinations of both with or without distributed topologies (for example, topologies other than client-server topologies). Networks can be completely private and not connected to the Internet. For example, some government networks are extensive and yet not connected to the Internet, and the security device 104 can be used in those networks.

The security device 104 monitors packets communicated on the network and performs security processing. Security processing includes, for example, blocking packets associated with an attempted network security intrusion, detecting and removing viruses, Data Leakage Prevention (DLP), and so on. The security device includes an interface 112, a filtering engine 114, and a flow-based security engine 116.

The interface 112 includes, in some implementations, one or more Ethernet ports for receiving and sending packets. In general, the packets are Transmission Control Protocol/Internet Protocol (TCP/IP) packets. Alternatively, the packets are User Datagram Protocol/Internet Protocol (UDP/IP) packets, Real Time Transport Protocol (RTP) packets, or other types of packets. The packets include header information and content information. For example, the header information of TCP/IP packets includes a five tuple including source address, destination address, source port, destination port, and protocol.

The filtering engine 114 determines whether the security device 104 will process packets using the flow-based security engine 116. In some implementations, the filtering engine 114 inspects the header information of received packets. Based on the header information, the filtering engine determines whether the security device 104 will process packets using the flow-based security engine 116. If the security device does not process a packet using the flow-based security engine 116, then the security device does not maintain a flow record for the flow associated with the packet.

In some implementations, the security device 104 allows packets to pass if it decides not to process those packets using the flow-based security engine 116. In other implementations, the security device 104 determines whether to allow packets to pass or to block those packets based on, for example, the header information of those packets.

A flow is a sequence of one or more packets communicating information between a source and a destination (for example, from a workstation 102 to the DNS server 110). A flow typically includes packets going in one direction (source to destination or the reverse) but in some implementations can include packets going in both directions. For example, in some implementations, a flow is a TCP connection or one side of a TCP connection (going only from a source to a destination). In another example, a flow is a sequence of UDP packets. Although UDP is connectionless, the flow based security engine 116 can identify a UDP flow based on, for example, header information of the UDP packets.

In some implementations, the flow-based security engine includes a flow table 118. The flow table 118 includes flow records for flows associated with packets. A flow record includes, for example, a five tuple of header information and other flow information. Flow information includes, for example, security policy information (for example, policy to apply to the flow, such as firewall policy, IPS policy, and so on), encryption parameters, address translation parameters, bookkeeping information, statistics, network policy information (for example, relating to connection time outs, time billing, bandwidth usage), a reference to one or more applications associated with the flow, and so on. Flow tables are discussed further in reference to FIG. 4 which is a diagram of an example flow table.

The flow-based security engine processes a packet by determining whether a flow record for a flow associated with that packet exists, for example, in a flow table 118. In some implementations, where the flow is one side of a TCP connection, the flow-based security engine uses, for example, the five tuple of source address, destination address, source port, destination port, and protocol (TCP in this case) to determine if a flow record in the flow table 118 has a matching record.

If the flow record exists, then the flow-based security engine 116 performs security processing using the packet and any flow information included in the flow record. If the flow record does not exist, then the flow-based security engine 116 creates a new flow record and, in general, adds the new flow record to the flow table 118. The flow-based security engine 116 determines whether to add any flow information to the flow record (for example, instructions to drop all packets associated with the flow). The flow-based security engine 116 then performs security processing for the packet.

Although only three workstations 102 are shown, potentially large numbers of workstations 102 can be protected using the security device 104. In that case, the workstations can generate a large number of flows and saturate the flow table 118. For example, if the flow table 118 is only able to hold 1 million flow records, and the workstations 102 simultaneously make one million DNS requests to the DNS server 110, then the flow table 118 will saturate. New flows, for example, from the network 108 to the workstations 102, will be blocked by the security device 104 because it cannot process them.

However, if the DNS server 110 is trusted (for example, if it is closely controlled), then the one million DNS requests do not have to be processed using the flow-based security engine 116. The filtering engine 114 can be configured so that, for any packets bound from a workstation 102 and destined to the DNS server 110, those packets are not processed using the flow-based security system and are allowed to pass. Then, the one million DNS requests will not saturate the flow table 118 and the security device 104 can process new flows using the flow-based security engine 116.

Similarly, when a workstation 102 attempts to download a file using a peer-to-peer application (for example, eMule), the workstation 102 can rapidly create many new flows while trying to download the file from many peer-to-peer clients over network 108. Thus, the flow table 118 can potentially become saturated. However, the filtering engine 114 can be configured so that, for any packets bound from a workstation 102 to a known peer-to-peer client, those packets are not processed using the flow-based security system 116. The security device 104 can either allow those packets to pass or block them. Other types of inspection free scenarios are possible, such as those between trusted devices, trusted zones or other configurations.

Figure 2:
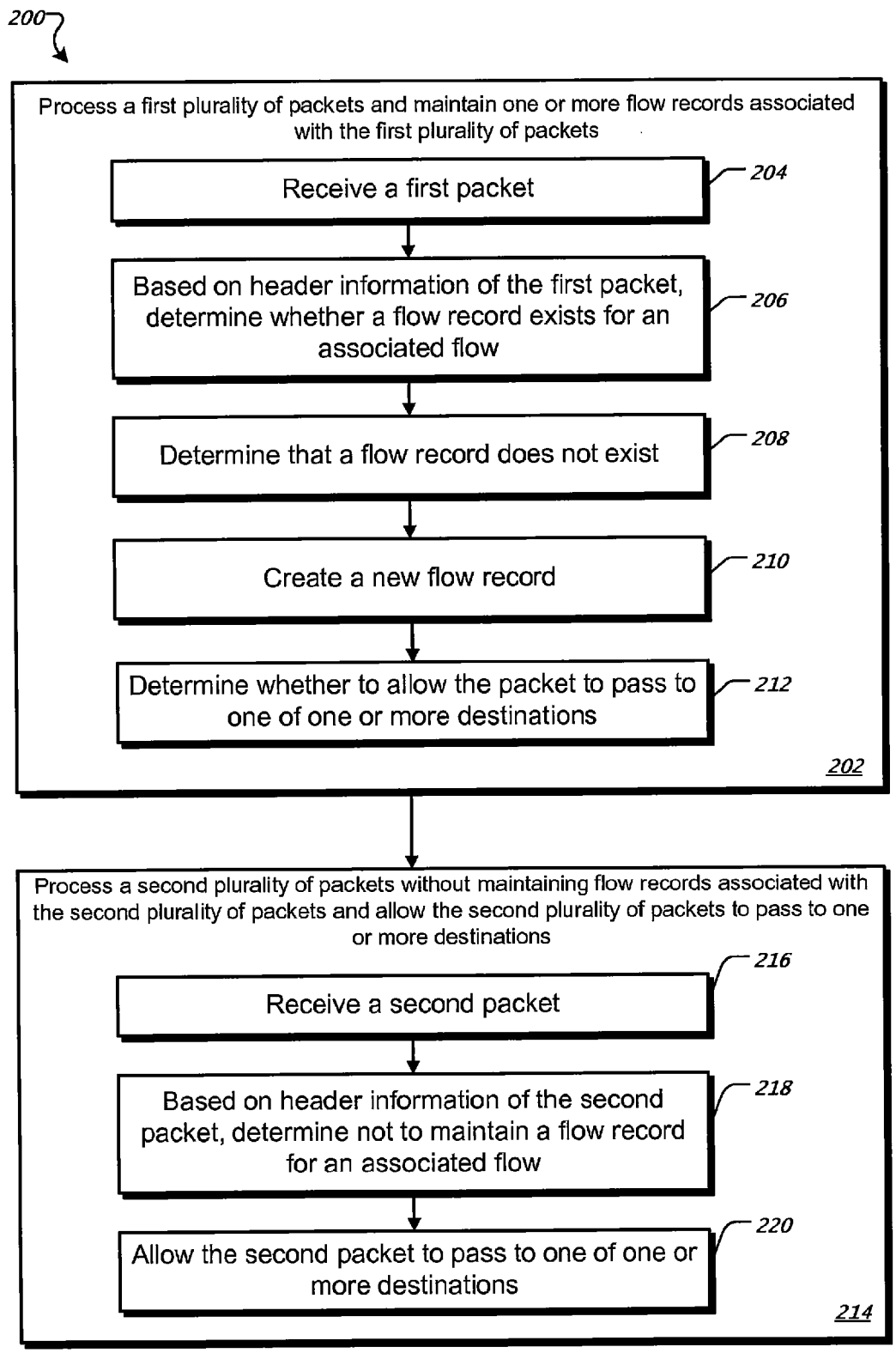
FIG. 2 is a flow diagram of an example technique 200 for processing packets at a security device.

FIG. 2 is a flow diagram of an example technique 200 for processing packets at a security device. The security device can be, for example, a firewall, an IDS, an IPS, a UTM device, a device with functionality of combinations of these devices, or the like.

At step 202, a first plurality of packets are processed and one or more flow records associated with the first plurality of packets are maintained (step 202). Processing the first plurality of packets includes steps 204, 206, 208, 210, and 212. Processing the first plurality of packets can be performed by a security device (for example, security device 104).

A first packet is received (step 204). The first packet includes header information and content. The first packet can be from, for example, a workstation (for instance, workstation 102) with a destination of a server on the Internet (for example, to network 108).

A determination is made whether a flow record exists for a first flow associated with the first packet (step 206). The first flow associated with the first packet comprises a sequence of one or more packets received by the security device. The first packet belongs to the sequence of one or more packets. The sequence of one or more packets communicates information between a first source and a first destination.

In some implementations, where the first packet is a TCP/IP packet and the first flow is one half of a TCP connection, a security device can inspect the header information of the first packet to determine a five tuple of source address, destination address, source port, destination port, and protocol (in this case, TCP). In some implementations, each packet of the first flow has the same five tuple. The security device uses the five tuple to determine whether a flow table (or other data structure) includes a flow record for the first flow.

A determination is made that a flow record for the first flow does not exist (step 208). For example, in some cases, a security device searches each flow record in a flow table and does not find a flow record for the first flow. In another example, where a flow table including flow records is a hash table, the security device searches the hash table (for instance, using a hash of a five tuple) and does not find a flow record for the first flow. Various techniques for determining whether a flow record for the first flow exists are possible.

A new flow record for the first flow is created (step 210). In some implementations, the new flow record is added to a flow table. In some implementations, a security device determines flow information (for example, whether to allow or drop packets associated with the first flow) and adds the flow information to the new flow record.

A determination is made whether to allow the first packet to pass to its destination (step 212). A security device can use various techniques or combinations of techniques to make the determination. In some implementations, the security device is configured with a list of destination addresses (or addresses and ports) or source addresses (or addresses and ports) to block. In some implementations, the security device is configured with a list of applications and instructions to block any packets associated with those applications. In some implementations, the security device identifies an application associated with the first packet (or attempts to identify the application) and determines whether to allow the first packet to pass based on the application.

If a determination is made to allow the first packet to pass, then the first packet is transmitted (for example, to a router such as router 106) (step 213). Else, the packet is dropped, logged or otherwise processed (214). In some implementations, a security device logs blocked packets. In some implementations, the security device reports blocked packets, for example, to a central management system.

In some implementations, the security device performs other security processing using the first packet. For example, the security device can remove a virus (or an infected portion of the first packet) from the first packet. In another example, the security device can remove confidential information (for example, a credit card number or a social security number) from the first packet.

A second plurality of packets is thereafter processed without maintaining flow records associated with the second plurality of packets (allowing the second plurality of packets to pass) (step 215). Processing the second plurality of packets includes steps 216, 218, and 220.

A second packet is received (step 216). For example, the second packet can be a UDP packet from a workstation (for instance, workstation 102) to a DNS server (for instance, DNS server 110). In another example, the second packet can be a TCP SYN packet from a workstation (for instance, workstation 102) attempting to open a TCP connection using a peer-to-peer file sharing application (for instance, over network 108).

A determination is made (e.g., based on header information) not to maintain a flow record for a second flow associated with the second packet (step 218). In some implementations, a security device compares some header information (for example, the five tuple of source address and port, destination address and port, and protocol) against a list specifying types of packets for which the security device is not to maintain flow records.

In some implementations, the security device includes a flow-based security engine (for example, security device 104 includes flow-based security engine 116). In some implementations, the security device determines not to process the second packet using the flow-based security engine.

The second packet is allowed to pass to its destination (step 220). In some implementations, a security device allows all packets that it does not maintain flow records for to pass. In some implementations, the security device determines whether to allow the second packet to pass or to block the second packet. For example, the security device can compare some of the header information of the second packet against a list specifying whether to allow certain types of packets or block certain types of packets. In another example, the security device performs security processing (for instance, scanning for viruses, or the like) without maintaining a flow record for the second flow. In a further example, the security device compares some of the header information of the second packet against a list specifying whether to allow or block certain IP addresses, port numbers, or both.

Because the security device does not maintain a flow record for the second flow, the security device has more memory (or other resources) available for other flows (for example, the first flow associated with the first packet). This can prevent the security device from causing a denial of service (when a flow table is saturated or the security device is otherwise low on resources such as processing power) and thus increases the availability of the security device.

For example, in some cases, a first amount of memory allocated at the security device for a flow table is smaller than a second amount of memory required for flow records in the flow table for flows associated with the both the first plurality of packets and the second plurality of packets. In those cases, if the security device maintained flow records for both the first plurality of packets and the second plurality of packets, the flow table will saturate and the security device will be unable to process packets associated with new flows. However, if the security device does not maintain flow records for the second plurality of packets, and if the first amount of memory is greater than a third amount of memory required for flow records in the flow table for flows associated with the first plurality of packets (and not the second plurality of packets), then the flow table will not saturate and the security device will be available to process packets associated with new flows.

Figure 3:
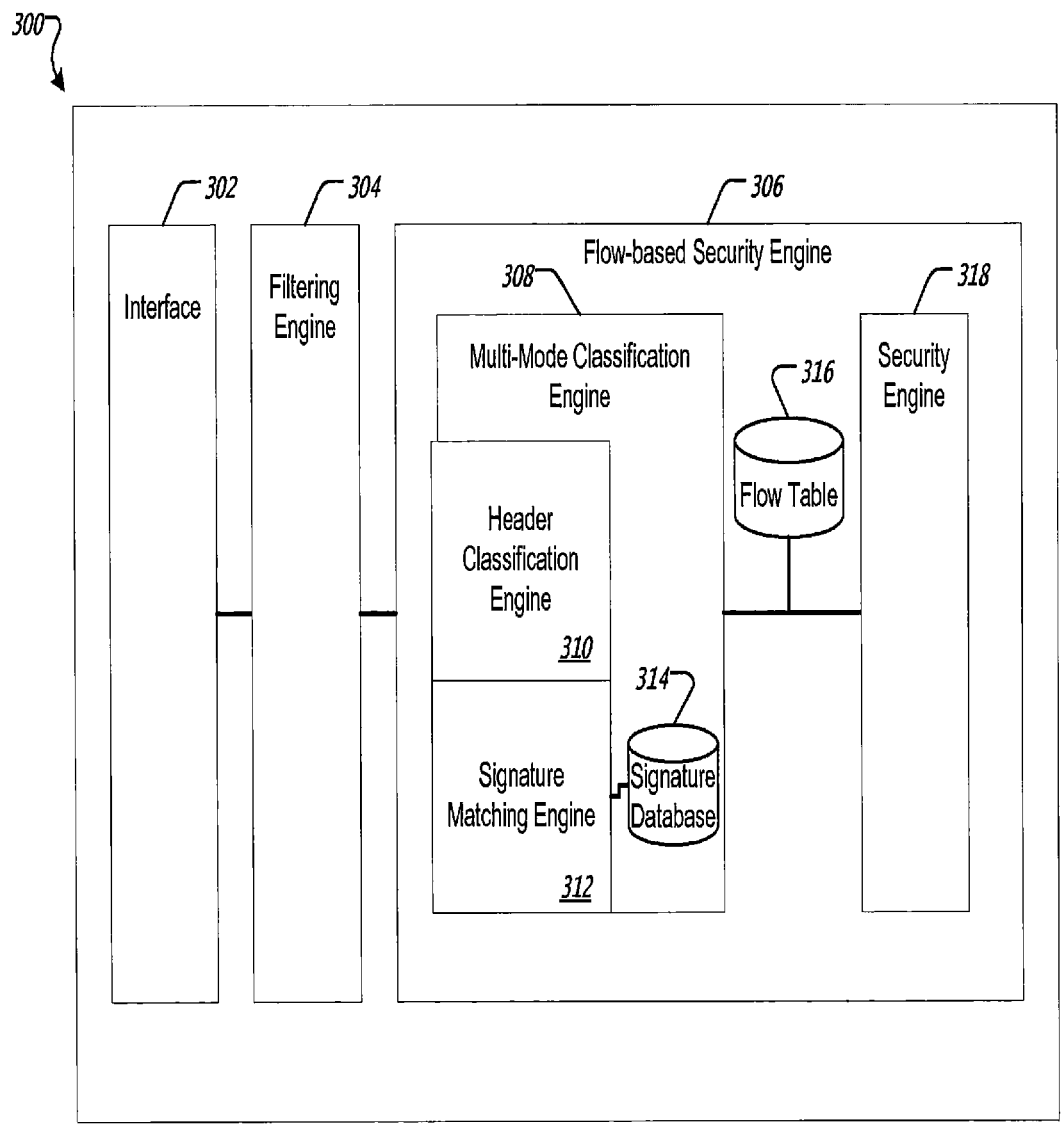
FIG. 3 is a block diagram of an example security device 300.

FIG. 3 is a block diagram of an example security device 300. The security device 300 is one example of a security device configured to execute the technique 200 described in reference to FIG. 2.

The security device 300 includes an interface 302 for incoming and outgoing packets, a filtering engine 304, and a flow-based security engine 306. The interface 102 can include, for example, one or more Ethernet ports for receiving and sending packets. When the security device 300 receives packets, the filtering engine 304 determines whether to process the packets using the flow-based security engine 306. The filtering engine 304 makes that determination based on, for example, header information in the packets.

The flow-based security engine includes a multi-mode classification engine 308, a flow table 316, and a security engine 318. The multi-mode classification engine 308 analyzes packets and attempts to identify applications associated with packets. The multi-mode classification engine can also attempt to classify other attributes of the packets.

In some implementations, the multi-mode classification engine 308 includes plural modes for classifying incoming packets that are updated as more packets are received. Multi-mode classification engine 308 includes a header classification engine 310 and a signature matching engine 312.

The header classification engine 310 uses header information of a received packet to classify the packet for further processing. For example, in some implementations the header classification engine 310 identifies a five-tuple of information about each packet, including protocol, source address, source port, destination address, and destination port. Other techniques for header classification are possible.

The signature matching engine 312 classifies packets for further processing based on signatures detected, for example at the application level. The signature matching engine 312 uses the contents of received packets. In general, the signature matching engine 312 includes a signature database 314 that is typically local. In some implementations, the signature database 314 is distributed onto devices remote from the security device 300. Signature matching can include fixed pattern matching, regular expression matching, and specialized matching performed by, for example, specialized software to detect complex application behavior patterns or a combination of the above. In some implementations, the multi-mode classification engine 304 performs Transmission Control Protocol (TCP) reassembly before performing signature matching or other analysis to determine an application associated with received packets.

The flow table 316 includes flow records associated with flows. The flow records in the flow table 316 include flow information. In some implementations, flow information includes information identifying an application associated with a flow. The signature matching engine 312 attempts to identify applications associated with flows and when it is successful it updates the flow table 316.

The security engine 318 performs security processing. Security processing includes, for example, blocking packets associated with an attempted network security intrusion, detecting and removing viruses, Data Leakage Prevention (DLP), and so on. If the security engine 318 determines that a flow should be blocked, the security engine 318 can add an indication to a corresponding flow record in the flow table 316.

Figure 4:
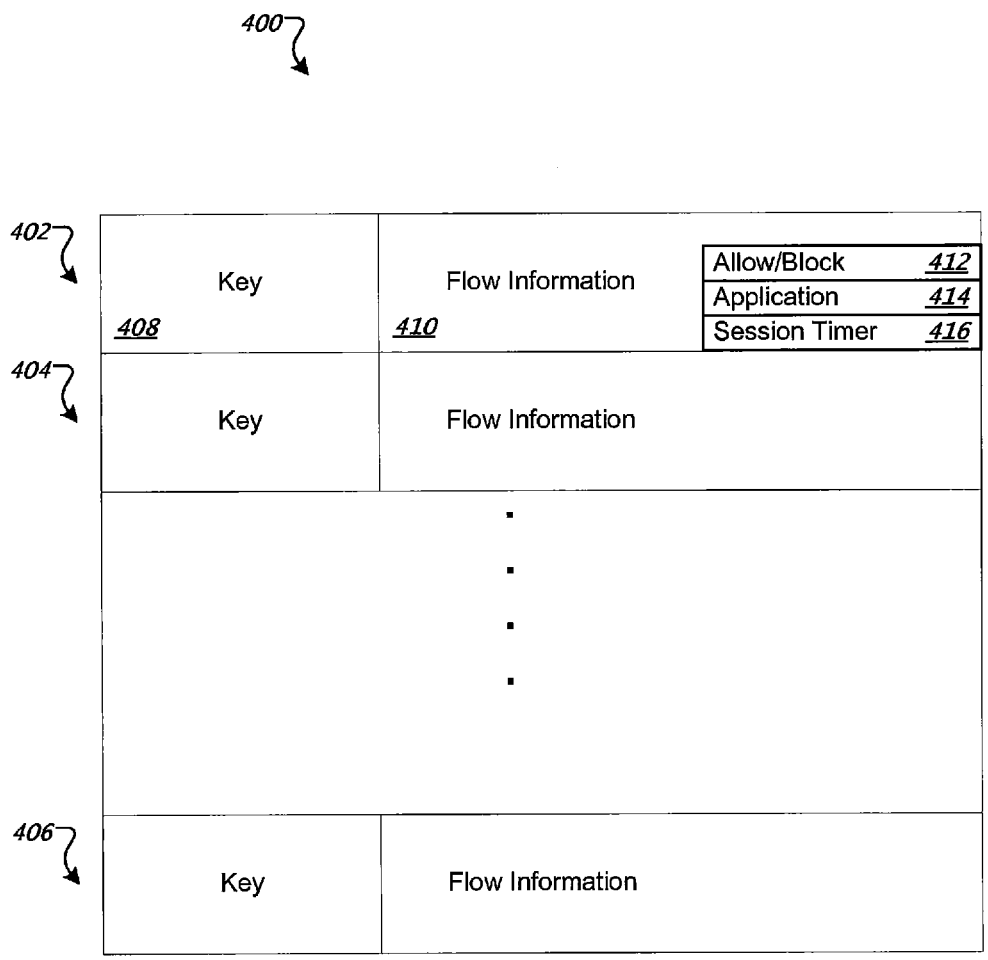
FIG. 4 illustrates a structure of an example flow table 400.

FIG. 4 illustrates a structure of an example flow table 400. The rows 402, 404, and 406 of the flow table 400 represent flow records associated with flows.

The first flow record 402 includes an indexing key 408. A security device can use the indexing key 408 to store and retrieve the flow record 402 when it receives a packet associated with the flow. In some implementations, the indexing key 408 is a hash key (for example, based on header information) and the flow table 400 is implemented as a hash table. The flow record 402 also includes flow information 410.

Flow information 410 includes, for example, an indication 412 of whether to allow or deny packets associated with the flow, a reference 414 to an application (for example, peer-to-peer networking application eMule) associated with the flow, and a session timer 416. The session timer 416 indicates how long a session (for example, a TCP session) has been in a certain state (for example, whether a TCP connection is open or currently being established). In some implementations, a security devices removes flow records from the flow table 400 when the session timer indicates that a session has been in a certain state (for example, establishing a TCP connection) for a time greater than a threshold time. This can reduce the number of flow records in the flow table and thus improve availability of the security device.

Figure 5:
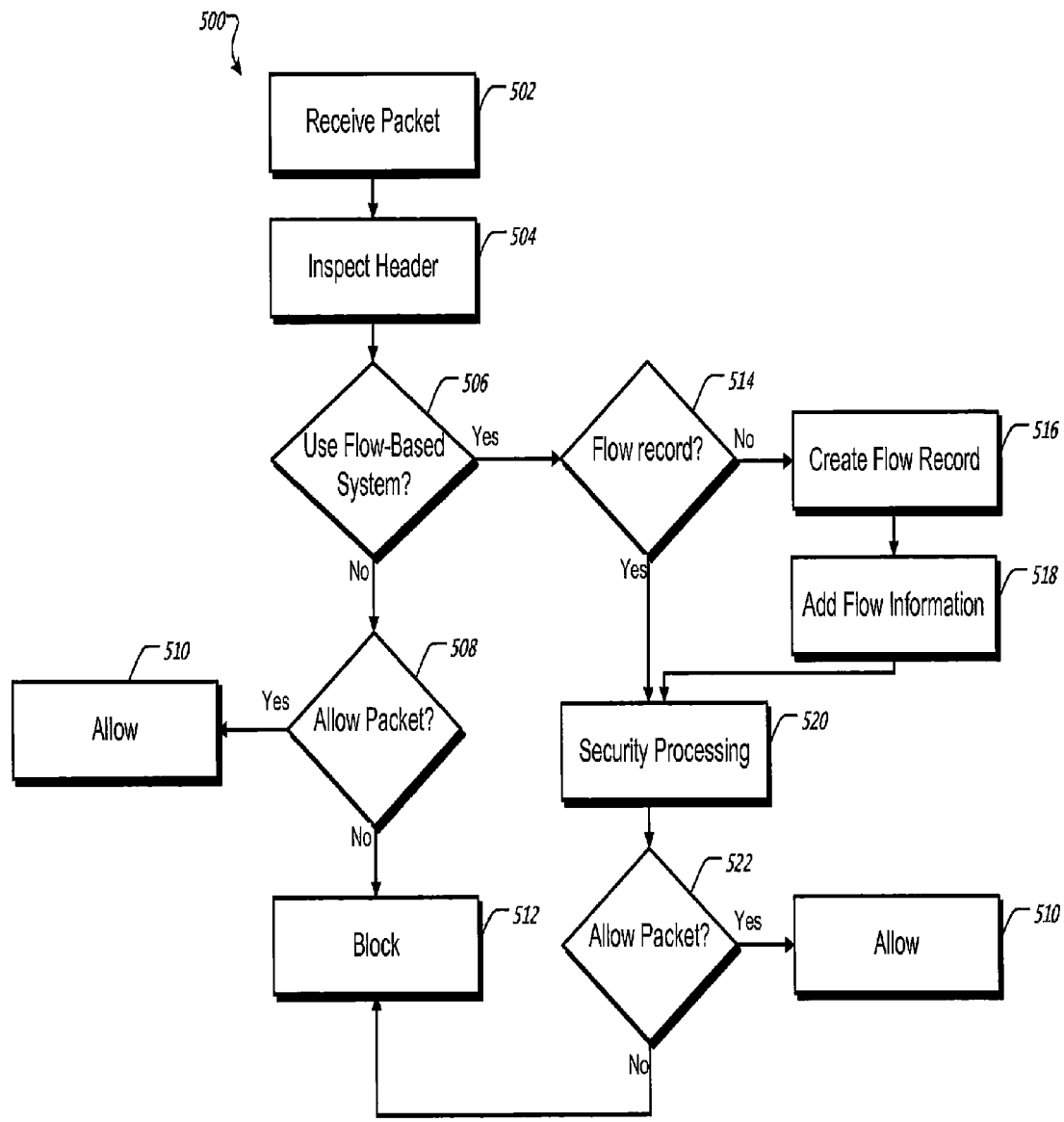
FIG. 5 is a flow diagram of an example technique 500 for processing packets at a security device and improving availability of the security device.

FIG. 5 is a flow diagram of an example technique 500 for processing packets (e.g., at a security device). The technique will be described with reference to a security device, though more than one or other component configurations are possible.

A packet is received (step 502). A determination is made (e.g., based on header information in the packet) whether to process the packet (e.g., using a flow-based security system) (step 506).

If it is determined not to process the packet (e.g., using a flow-based security system), the packet is allowed to pass to its destination or optionally a determination is made whether to allow the packet or block the packet (step 508). A security device can make that determination using, for example, the header information of the packet or the content, but not using a flow table. Based on that determination, the packet is allowed (step 510) or blocked (step 512).

If the security device determines to process the packet (e.g., using the flow-based security system), a determination is made whether a flow record for a flow associated with the packet exists (step 514). If a flow record does not exist, a flow record is created (step 516) and optionally flow information is added to the flow record (step 518). Security processing of the packet is initiated (step 520). A determination of whether to allow the packet or to block the packet is made (step 522). Based on that determination, the packet is allowed (step 510) or blocked (step 512).

Figure 6:
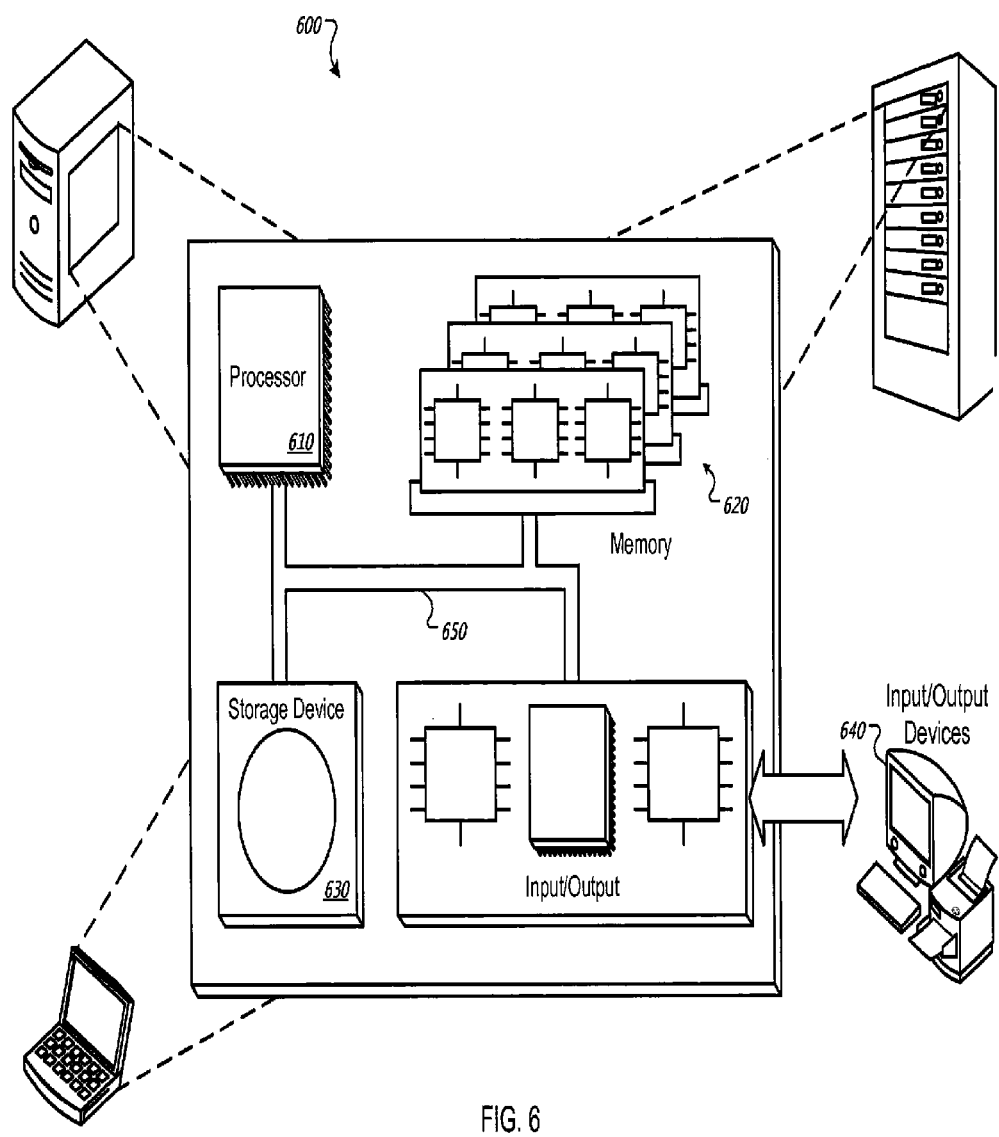
FIG. 6 is a schematic diagram of a generic computer system 600.

FIG. 6 is a schematic diagram of a generic computer system 600. The system 600 can be used for practicing operations described in association with the techniques 200 and 500 described above. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of security device 300, for example. In some implementations, the processor 610 is a single-threaded processor. In other implementations, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non volatile that stores information within the system 600. The memory 620 can store data structures representing flow tables, for example. The storage device 630 is capable of providing persistent storage for the system 600. The storage device 630 can be a floppy disk device, a hard disk device, an optical disk device, or a tape device, or other suitable persistent storage means. The input/output device 640 provides input/output operations for the system 600. In some implementations, the input/output device 640 includes a keyboard and/or pointing device. In various implementations, the input/output device 640 includes a display unit for displaying graphical user interfaces.

The input/output device 640 can provide input/output operations for a security device. For example, the input/output device 640 can include Ethernet ports or other networking ports to communicate with computer networks.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some implementations, users can interact with a security device using a computer on a network. For example, a user on a personal computer can interact with a security device connected on the network using a web browser, a Secure Shell (SSH) client, a telnet client, or the like. In various implementations, a user can interact with a security device using a computer connected to the security device on a serial port, for example, a Recommended Standard 232 (RS-232) port.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method implemented by a security device, comprising:

filtering a plurality of packets into a filtered first plurality of packets and a filtered second plurality of packets based on header information of each of the plurality of packets, wherein the filtering the plurality of packets comprises:

filtering the plurality of packets into the filtered second plurality of packets in response to the header information of the corresponding packets being associated with Domain Name Service (DNS) traffic or a peer-to-peer networking application, wherein the DNS traffic relates to communications with a trusted DNS server, the trusted DNS server being a closely-controlled DNS server, and wherein the peer-to-peer networking application relates to a file download using the peer-to-peer networking application;

processing the filtered first plurality of packets using one or more processors of the security device and maintaining one or more flow records associated with the filtered first plurality of packets, and processing the filtered second plurality of packets using one or more processors of the security device without maintaining flow records associated with the filtered second plurality of packets and allowing the filtered second plurality of packets to pass to one or more destinations, where processing the filtered second plurality of packets includes:

receiving a second packet;

determining not to maintain a flow record for a second flow associated with the second packet; and allowing the second packet to pass to one of the one or more destinations.

2. The method of claim 1 wherein processing the filtered first plurality of packets includes receiving a first packet and, based on first header information of the first packet, determining whether a flow record exists for a first flow associated with the first packet, where the first flow associated with the first packet comprises a sequence of one or more packets received to which the first packet belongs.

3. The method of claim 2 further comprising:
determining that a flow record for the first flow associated with the first packet does not exist;
creating a new flow record for the first flow associated with the first packet; and
determining whether to allow the first packet to pass to one of the one or more destinations.

4. The method of claim 3 wherein determining whether a flow record exists for a first flow associated with the first packet includes determining whether the flow record is present in a flow table; and
wherein creating a new flow record for the first flow associated with the first packet includes adding the new flow record to the flow table.

5. The method of claim 3 wherein creating a new flow record for the first flow associated with the first packet includes identifying an application associated with the first packet.

6. The method of claim 2 wherein the first header information includes two or more of: a source port, a destination port, a source address, a destination address, and a protocol.

7. The method of claim 1 wherein determining not to maintain a flow record for a second flow associated with the second packet includes determining that the second packet is associated with the peer-to-peer networking application.

8. The method of claim 1 wherein determining not to maintain a flow record for a second flow associated with the second packet includes determining that the second packet is associated with the Domain Name Service (DNS) traffic.

9. The method of claim 1, wherein the second packet is a transmission control protocol (TCP) packet.

10. The method of claim 1, wherein the second packet is a user datagram protocol (UDP) packet.

11. A system comprising:
a non-transitory computer-readable medium including a program product; and
one or more processors configured to interact with the non-transitory computer-readable medium, execute the program product and perform operations comprising:
filtering a plurality of packets into a filtered first plurality of packets and a filtered second plurality of packets based on header information of each of the plurality of packets, wherein the filtering the plurality of packets comprises:
filtering the plurality of packets into the filtered second plurality of packets in response to the header information of the corresponding packets being associated with Domain Name Service (DNS) traffic or a peer-to-peer networking application, wherein the DNS traffic relates to communications with a trusted DNS server, the trusted DNS server being a closely-controlled DNS server, and wherein the peer-to-peer networking application relates to a file download using the peer-to-peer networking application;

processing the filtered first plurality of packets using one or more processors and maintaining one or more flow records associated with the filtered first plurality of packets, and processing the filtered second plurality of packets without maintaining flow records associated with the filtered second plurality of packets and allowing the filtered second plurality of packets to pass to one or more destinations, where processing the filtered second plurality of packets includes:

receiving a second packet;

determining not to maintain a flow record for a second flow associated with the second packet; and allowing the second packet to pass to one of the one or more destinations.

12. The system of claim 11 wherein processing the filtered first plurality of packets includes receiving a first packet and, based on first header information of the first packet, determining whether a flow record exists for a first flow associated with the first packet, where the first flow associated with the first packet comprises a sequence of one or more packets received to which the first packet belongs.

13. The system of claim 12 wherein the operations further comprise:
determining that a flow record for the first flow associated with the first packet does not exist;
creating a new flow record for the first flow associated with the first packet; and
determining whether to allow the first packet to pass to one of the one or more destinations.

14. The system of claim 13 wherein determining whether a flow record exists for a first flow associated with the first packet includes determining whether the flow record is present in a flow table; and
wherein creating a new flow record for the first flow associated with the first packet includes adding the new flow record to the flow table.

15. The system of claim 13 wherein creating a new flow record for the first flow associated with the first packet includes identifying an application associated with the first packet.

16. The system of claim 12 wherein the first header information includes two or more of: a source port, a destination port, a source address, a destination address, and a protocol.

17. The system of claim 11 wherein determining not to maintain a flow record for a second flow associated with the second packet includes determining that the second packet is associated with the peer-to-peer networking application.

18. The system of claim 11 wherein determining not to maintain a flow record for a second flow associated with the second packet includes determining that the second packet is associated with the Domain Name Service (DNS) traffic.

19. The system of claim 11, wherein the second packet is a transmission control protocol (TCP) packet.

20. The system of claim 11, wherein the second packet is a user datagram protocol (UDP) packet.

21. A non-transitory computer program product, encoded on a computer-readable storage device, operable to cause data processing apparatus to perform operations comprising:
  filtering a plurality of packets into a filtered first plurality of packets and a filtered second plurality of packets based on header information of each of the plurality of packets, wherein the filtering the plurality of packets comprises:
    filtering the plurality of packets into the filtered second plurality of packets in response to the header information of the corresponding packets being associated with Domain Name Service (DNS) traffic or a peer-to-peer networking application, wherein the DNS traffic relates to communications with a trusted DNS server, the trusted DNS server being a closely-controlled DNS server, and wherein the peer-to-peer networking application relates to a file download using the peer-to-peer networking application;
  processing the filtered first plurality of packets using one or more processors and maintaining one or more flow records associated with the filtered first plurality of packets, and
  processing the filtered second plurality of packets without maintaining flow records associated with the filtered second plurality of packets and allowing the filtered second plurality of packets to pass to one or more destinations, where processing the filtered second plurality of packets includes:
    receiving a second packet;
    determining not to maintain a flow record for a second flow associated with the second packet; and
    allowing the second packet to pass to one of the one or more destinations.

22. The program product of claim 21 wherein processing the filtered first plurality of packets includes receiving a first packet and, based on first header information of the first packet, determining whether a flow record exists for a first flow associated with the first packet, where the first flow associated with the first packet comprises a sequence of one or more packets received to which the first packet belongs.

23. The program product of claim 22 wherein the operations further comprise:
  determining that a flow record for the first flow associated with the first packet does not exist;
  creating a new flow record for the first flow associated with the first packet; and
  determining whether to allow the first packet to pass to one of the one or more destinations.

24. The program product of claim 23 wherein determining whether a flow record exists for a first flow associated with the first packet includes determining whether the flow record is present in a flow table; and
  wherein creating a new flow record for the first flow associated with the first packet includes adding the new flow record to the flow table.

25. The program product of claim 24 wherein creating a new flow record for the first flow associated with the first packet includes identifying an application associated with the first packet.

26. The program product of claim 22 wherein the first header information includes two or more of: a source port, a destination port, a source address, a destination address, and a protocol.

27. The program product of claim 21 wherein determining not to maintain a flow record for a second flow associated with the second packet includes determining that the second packet is associated with the peer-to-peer networking application.

28. The program product of claim 21 wherein determining not to maintain a flow record for a second flow associated with the second packet includes determining that the second packet is associated with the Domain Name Service (DNS) traffic.

29. The program product of claim 21, wherein the second packet is a transmission control protocol (TCP) packet.

30. The program product of claim 21, wherein the second packet is a user datagram protocol (UDP) packet.

* * * * *